(No Model.)

J. G. SHEARLOCK.
STEAM RADIATOR.

No. 356,293. Patented Jan. 18, 1887.

WITNESSES:
George L. Barnes
F. L. Ellis

INVENTOR
Joseph G. Shearlock
BY Julius Twiss
ATTORNEY

UNITED STATES PATENT OFFICE.

JOSEPH G. SHEARLOCK, OF NEW HAVEN, CONNECTICUT.

STEAM-RADIATOR.

SPECIFICATION forming part of Letters Patent No. 356,293, dated January 18, 1887.

Application filed December 18, 1885. Serial No. 186,077. (No model.)

*To all whom it may concern:*

Be it known that I, JOSEPH G. SHEARLOCK, a citizen of the United States, residing in New Haven, State of Connecticut, have invented new and useful Improvements in Steam-Radiators, of which the following is a specification.

My invention relates to that class of steam-radiators in which internal heating-tubes are arranged within the main heating-tubes, with the steam-space between the outer and inner tubes.

The object of my improvement is to provide an effective method of constructing tight and durable joints and of insuring an efficient circulation within the radiator.

The invention consists in the novel construction and mode of securing the upper ends of the pipes, and in a diaphragm dividing the spaces between the tubes, as hereinafter more fully described and claimed.

Figure 1:
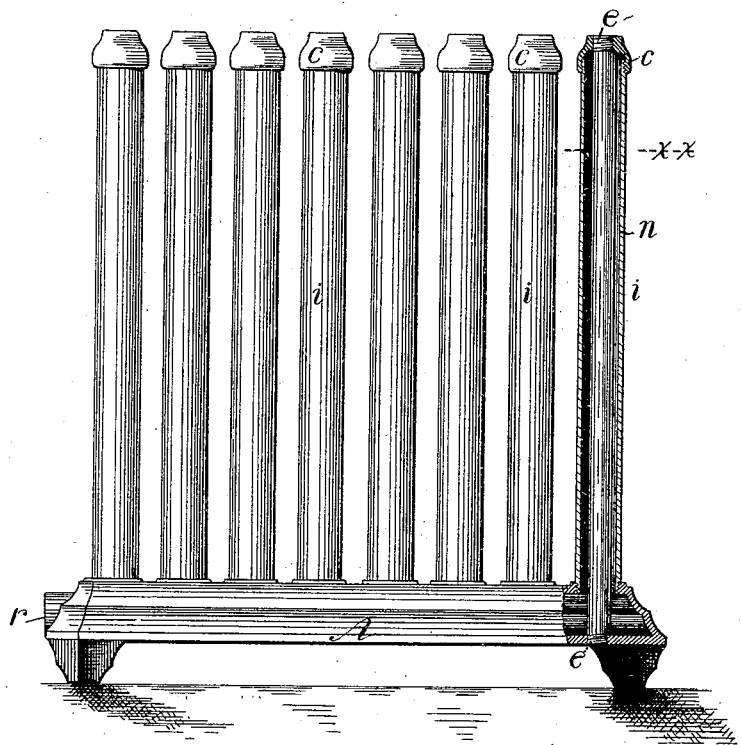
Figure 2:
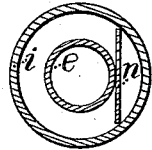

In the accompanying drawings, Figure 1 is a view of my improved radiator, shown partly in section; and Fig. 2 shows a section of the tubes and diaphragm on the line $x$ $x$, Fig. 1.

Referring to the drawings, A designates a hollow base or chamber, having a suitable inlet, $r$, through which the steam is admitted from the boiler. A series of steam-tubes, $i$, threaded externally at each end, are screwed vertically into the top of the base. A smaller tube, $e$, also threaded externally at each end, is arranged in each of the exterior tubes, with its lower end screwed into the bottom of the base.

The upper ends of the external and internal pipes are screwed into a reducing-coupling, $c$, which thus joins them securely. In order to fit the coupling equally tight upon each tube, the thread upon the internal tube is cut down sufficiently to allow the coupling to screw down tightly upon the external pipe or tube, and the internal joint is then tightened by expanding the internal tube until it fills the hole in the coupling. The smaller hole in the coupling is tapped out from the same direction as the larger hole, so that the taper of the thread (all pipe-threads being slightly tapered) shall be in the proper direction to receive the internal pipe. As the coupling screws simultaneously upon both pipes, all the threads upon the pipes may be cut in one direction—that is, either right-handed or left-handed, right-handed threads being preferable. As the internal pipe fits the coupling very tight when it is screwed down upon it, a very slight expansion of the internal tube after it is in place renders the tube perfectly tight. It would seem that this mode of constructing the joints avoids the use of left-handed threads, unions, lock-nuts, or ordinary smooth expanded joints, the threaded expanded joints being much tighter and less liable to loosen than an unthreaded joint.

If desired, the expanded joint may be made at the bottom of the radiator, instead of in the coupling; but the construction described is preferred.

A thin sheet-metal diaphragm, $n$, is fitted within the external pipe and bears against the outside of the internal tube, with its end resting on the bottom of the base A. The diaphragm extends nearly to the top of the tube and divides it into two compartments. The compartment containing the interior tube, $e$, radiates heat more rapidly than the opposite compartment, and consequently the temperature of the heating medium therein is correspondingly reduced. This variation in temperature between the two compartments causes an upward current on one side of the diaphragm and a reverse current on the opposite side, thereby effecting a superior circulation. By means of this active circulation the air is effectually expelled from the radiator when steam is admitted thereto.

I claim as new and desire to secure by Letters Patent—

1. In a radiator, in combination with the outer and inner tubes, a plate or diaphragm within the outer tube dividing the space between the inner and outer tubes, substantially as and for the purpose described.

2. In a radiator, in combination with the hollow base, the series of tubes $i$ $i$, connected with the space within the base, the smaller tubes or pipes $e$ $e$ within the tubes $i$ $i$, reducing-couplings between the upper ends of the outer tubes and inner pipes, adapted to close the ends of the spaces between such tubes and pipes, and the plates $n$ $n$, substantially as and for the purpose described.

JOS. G. SHEARLOCK.

Witnesses:
 FREDERICK L. ELLIS,
 S. D. FAIRCHILD.